US 11,809,360 B2

(12) United States Patent
Liu et al.

(10) Patent No.: US 11,809,360 B2
(45) Date of Patent: *Nov. 7, 2023

(54) NETWORK-ON-CHIP DATA PROCESSING METHOD AND DEVICE

(71) Applicant: Shanghai Cambricon Information Technology Co., Ltd., Pudong New Area (CN)

(72) Inventors: Shaoli Liu, Pudong New Area (CN); Zhen Li, Pudong New Area (CN); Yao Zhang, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/564,411

(22) Filed: Dec. 29, 2021

(65) Prior Publication Data
US 2022/0121598 A1 Apr. 21, 2022

Related U.S. Application Data

(63) Continuation of application No. 17/278,812, filed as application No. PCT/CN2019/111977 on Oct. 18, 2019.

(30) Foreign Application Priority Data

Oct. 18, 2018 (CN) ............................. 201811215820
Oct. 18, 2018 (CN) ............................. 201811215978
(Continued)

(51) Int. Cl.
*G06F 13/40* (2006.01)
*G06N 3/04* (2023.01)

(52) U.S. Cl.
CPC .......... *G06F 13/4068* (2013.01); *G06N 3/04* (2013.01)

(58) Field of Classification Search
CPC ............................. G06F 13/4068; G06N 3/04
See application file for complete search history.

(56) References Cited

U.S. PATENT DOCUMENTS

2009/0128571 A1   5/2009   Smith et al.
2012/0303848 A1  11/2012   Vallapaneni et al.
(Continued)

FOREIGN PATENT DOCUMENTS

CN    101227486 A    7/2008
CN    102075578 A    5/2011
(Continued)

OTHER PUBLICATIONS

EP 19873122.6—Extended European Search Report, dated May 20, 2022, 13 pages.
(Continued)

*Primary Examiner* — David E Martinez
(74) *Attorney, Agent, or Firm* — Getech Law LLC; Jun Ye

(57) ABSTRACT

The present application relates to a network-on-chip data processing method. The method is applied to a network-on-chip processing system, the network-on-chip processing system is used for executing machine learning calculation, and the network-on-chip processing system comprises a storage device and a calculation device. The method comprises: accessing the storage device in the network-on-chip processing system by means of a first calculation device in the network-on-chip processing system, and obtaining first operation data; performing an operation on the first operation data by means of the first calculation device to obtain a first operation result; and sending the first operation result to
(Continued)

a second calculation device in the network-on-chip processing system. According to the method, operation overhead can be reduced and data read/write efficiency can be improved.

14 Claims, 11 Drawing Sheets

(30) Foreign Application Priority Data

| | | |
|---|---|---|
| Oct. 18, 2018 | (CN) | 201811216718 |
| Oct. 18, 2018 | (CN) | 201811216857 |
| Nov. 21, 2018 | (CN) | 201811390409 |
| Nov. 21, 2018 | (CN) | 201811390428 |
| Nov. 21, 2018 | (CN) | 201811392232 |
| Nov. 21, 2018 | (CN) | 201811392262 |
| Nov. 21, 2018 | (CN) | 201811392270 |
| Nov. 21, 2018 | (CN) | 201811392279 |
| Nov. 21, 2018 | (CN) | 201811393352 |

(56) References Cited

U.S. PATENT DOCUMENTS

| | | |
|---|---|---|
| 2012/0303933 A1 | 11/2012 | Manet et al. |
| 2017/0083338 A1 | 3/2017 | Burger et al. |
| 2018/0004518 A1 | 1/2018 | Plotnikov et al. |

FOREIGN PATENT DOCUMENTS

| | | | |
|---|---|---|---|
| CN | 102591759 | A | 7/2012 |
| CN | 102868644 | A | 1/2013 |
| CN | 103218208 | A | 7/2013 |
| CN | 103580890 | A | 2/2014 |
| CN | 105183662 | A | 12/2015 |
| CN | 107316078 | A | 11/2017 |
| CN | 107578095 | A | 1/2018 |
| CN | 107920025 | A | 4/2018 |
| CN | 107992329 | A | 5/2018 |
| CN | 108427990 | A | 8/2018 |
| CN | 108431770 | A | 8/2018 |
| CN | 108470009 | A | 8/2018 |
| JP | H01179515 | A | 7/1989 |
| JP | H04507027 | A | 12/1992 |
| JP | H05274455 | A | 10/1993 |
| JP | H09120391 | A | 5/1997 |
| JP | 2738141 | B2 | 4/1998 |
| JP | 2001501755 | A | 2/2001 |
| JP | 2006286002 | A | 10/2006 |
| JP | 2008301109 | A | 12/2008 |
| JP | 2015509183 | A | 3/2015 |
| JP | 2018514872 | A | 6/2018 |
| KR | 100520807 | B1 | 10/2005 |
| KR | 1020100044278 | A | 4/2010 |
| KR | 1020100125331 | A | 11/2010 |
| KR | 101306354 | B1 | 9/2013 |
| KR | 1020160127100 | A | 11/2016 |
| KR | 1020170125396 | A | 11/2017 |
| WO | 2015087424 | A1 | 6/2015 |
| WO | 2017185418 | A1 | 11/2017 |
| WO | 2018103736 | A1 | 6/2018 |
| WO | WO-2018103736 | A1 * | 6/2018 ......... G06F 13/1678 |
| WO | 2018126073 | A1 | 7/2018 |

OTHER PUBLICATIONS

EP 21217802.4—Extended European Search Report, dated May 3, 2022, 11 pages.
EP 21217809.9—Extended European Search Report, dated May 10, 2022, 11 pages.
EP 21217811.5—Extended European Search Report, dated May 9, 2022, 11 pages.
KR 10-2020-7034133—Notification of Reason for Refusal, dated Jul. 14, 2022, 11 pages.
KR 10-2020-7034126—Office Action, dated Jul. 25, 2022, 13 pages.
KR 10-2020-7034138—Office Action, dated Jul. 19, 2022, 15 pages.
KR 10-2020-7034145—Office Action, dated Jul. 25, 2022, 7 pages.
CN 201811215820.7—First Office Action, dated Aug. 26, 2021, 31 pages. (with English translation).
CN 201811215978.4—First Office Action, dated Aug. 26, 2021, 32 pages. (with English translation).
CN 201811216718.9—First Office Action, dated Aug. 26, 2021, 21 pages. (with English translation).
CN 201811390409.—First Office Action, dated Feb. 20, 2021, 10 pages. (with English translation).
CN 201811392232.0—First Office Action, dated Feb. 10, 2021, 11 pages. (with English translation).
CN 201811392270.6—First Office Action, dated Aug. 18, 2021, 12 pages. (with English translation).
JP 2020206272—Notice of Reasons for Refusal, dated Nov. 24, 2021, 7 pages. (with English translation).
JP 2020206281—Notice of Reasons for Refusal, dated Dec. 9, 2021, 8 pages. (with English translation).
JP 2020206293—Notice of Reasons for Refusal, dated Dec. 9, 2021, 8 pages. (with English translation).
JP 2020206306—Notice of Reasons for Refusal, dated Dec. 9, 2021, 8 pages. (with English translation).
JP 2020569113—Notice of Reasons for Refusal, dated Nov. 24, 2021, 7 pages. (with English translation).
CN201811216857.1—Chinese Office Action dated Jan. 3, 2023, 22 pages. (With Brief English Explanation).
Ebrahimi et. al., "Cluster-based topologies for 3D Networks-on-Chip using advanced inter-layer bus architecture", Journal of Computer and System Sciences, vol. 79, Issue 4, Jun. 2013, pp. 475-491.
PCT /CN2019/111977—International Search Report and Written Opinion dated Jan. 22, 2020, 13 pages.
KR20207034126—Written Decision on Registration mailed on May 8, 2023, 6 pages.
KR20207034133—Written Decision on Registration mailed on May 8, 2023, 6 pages.
KR20207034138—Written Decision on Registration mailed on May 8, 2023, 6 pages.
KR20207034145—Written Decision on Registration mailed on May 8, 2023, 6 pages.
CN201811216857.1—Second Office Action dated Jun. 1, 2023, 20 pages (With Brief English Explanation).

* cited by examiner

NETWORK-ON-CHIP DATA PROCESSING METHOD AND DEVICE

CROSS REFERENCES

This application is a continuation of U.S. patent application Ser. No. 17/278,812, filed Mar. 23, 2021, which is a 371 of International Application PCT/CN2019/111977, filed Oct. 18, 2019, which claims the benefit of priority from Chinese Application No. 201811216718.9 with the title of "Network-On-Chip Processing System and Network-On-Chip Data Processing Method", Chinese Application No. 201811215820.7 with the title of "Network-On-Chip Processing System and Network-On-Chip Data Processing Method", Chinese Application No. 201811215978.4 with the title of "Network-on-Chip Processing System and Network-on-Chip Data Processing Method", and Chinese Application No. 201811216857.1 with the title of "Network-on-Chip Data Processing Method, Storage Medium, Computer Equipment and Device", all of which were filed on Oct. 18, 2018; this application also claims the benefit of priority from Chinese Application No. 201811392232.0 with the title of "Data Processing Method, Device, and Related Product", Chinese Application No. 201811392262.1 with the title of "Data Processing Method, Device, and Related Product", Chinese Application No. 201811392279.7 with the title of "Data Processing Device, Method, and Related Product", Chinese Application No. 201811393352.2 with the title of "Data Processing Device, Method, and Related Product", Chinese Application No. 201811390409.3 with the title of "Data Processing Device, Method, and Related Product", Chinese Application No. 201811390428.6 with the title of "Data Processing Device and Related Product", and Chinese Application No. 201811392270.6 with the title of "Data Processing Device and Related Product", all of which were filed on Nov. 21, 2018. The disclosures of the above applications are incorporated herein by reference in their entirety.

TECHNICAL FIELD

The present disclosure relates to the field of information processing technology, and particularly relates to a network-on-chip data processing method and device.

BACKGROUND

With the development of semi-conductor technology, it has become a reality to integrate hundreds of millions of transistors on a single chip. The network-on-chip (NoC) is capable of integrating plenty of computation resources on a single chip and implementing on-chip communication.

As plenty of computations are required in a neural network, some of the computations, such as a forward operation, a backward operation, and weight update, need to be processed in parallel. In a chip architecture with a large number of transistors, chip design may face problems such as high memory access overhead, high bandwidth blockage, and low data reading/writing efficiency.

SUMMARY

In order to at least overcome the problems existing in the related technology to a certain extent, the present disclosure provides an interaction method, a device, and a smart terminal.

An embodiment of the present disclosure provides a network-on-chip (NoC) processing system. The system includes: a storage device and a plurality of computation devices, where the storage device and the plurality of computation devices are arranged on a same chip. At least one computation device is connected to the storage device, and at least two computation devices are connected to each other.

In an embodiment, any two of the plurality of computation devices are directly connected to each other.

In an embodiment, the plurality of computation devices include a first computation device and a plurality of second computation devices, where the first computation device is connected to the storage device, and at least one of the plurality of second computation devices is connected to the first computation device.

In an embodiment, at least two of the plurality of second computation devices are connected to each other, and are connected to the storage device through the first computation device.

In an embodiment, any two of the plurality of second computation devices are directly connected to the first computation device.

In an embodiment, each of the plurality of computation devices is connected to the storage device, and at least two computation devices are connected to each other.

An embodiment of the present disclosure provides a data processing device, where the device includes a machine learning device, a transmission circuit, and a shared memory. The machine learning device is connected to the transmission circuit through a first transmission interface, and the transmission circuit is connected to the shared memory;

the transmission circuit is configured to obtain input data required by the machine learning device from the shared memory according to a data operation signal sent by the machine learning device, and return the input data to the machine learning device, where the data operation signal represents an operation mode for data in the shared memory.

In an embodiment, the machine learning device includes at least one machine learning unit, where the machine learning unit includes: at least one operation unit, and a controller unit connected to the operation unit; the operation unit includes a primary processing circuit and a plurality of secondary processing circuits, where the operation unit is connected to the transmission circuit through the first transmission interface;

the controller unit is configured to send the data operation signal and the output data to the transmission circuit through a sending interface in the first transmission interface, receive the input data obtained by the transmission circuit from the shared memory through the receiving interface in the first transmission interface, and send the input data to the primary processing circuit and/or the secondary processing circuits;

the primary processing circuit is configured to distribute the input data to the plurality of secondary processing circuits; the plurality of secondary processing circuits are configured to perform intermediate operations in parallel according to the data transferred by the primary processing circuit to obtain a plurality of intermediate results, and transfer the plurality of intermediate results to the primary processing circuit; and the primary processing circuit is further configured to perform subsequent processing on the plurality of intermediate results to obtain a computation result.

In an embodiment, a structure of the primary processing circuit and the secondary processing circuits includes at least one of an H-type, a systolic array type, and a tree structure.

In an embodiment, the transmission circuit includes: a second transmission interface, at least one read/write processing circuit connected to a second transmission interface, and an arbitration circuit connected to the read/write processing circuit; the at least one machine learning unit is connected to the transmission circuit through a connection between the first transmission interface and the second transmission interface;

the read/write processing circuit is configured to receive the data operation signal sent by the at least one machine learning unit through the first transmission interface and the second transmission interface, transmit the data operation signal to the arbitration circuit, and transfer the data read from the shared memory to the at least one machine learning unit through the second transmission interface; and the arbitration circuit is configured to arbitrate the data operation signal received from the at least one read/write processing circuit according to a preset arbitration rule, and operate the data in the shared memory according to the data operation signal that has been successfully arbitrated.

In an embodiment, the read/write processing circuit includes at least one of the following processing circuits: a unicast read processing circuit, a unicast write processing circuit, and a broadcast processing circuit; the data operation signal includes at least one of the following: a unicast read request, a unicast write request, a unicast read instruction, a unicast write instruction, a multicast instruction, and a broadcast instruction, where a unicast-type processing circuit is configured to process a unicast-type signal, and a broadcast-type processing circuit is configured to process a multicast-type or broadcast-type signal.

In an embodiment, if the data operation signal is an instruction-type signal, the read/write processing circuit is specifically configured to parse the instruction-type signal, generate a request-type signal, and transmit the request-type signal to the arbitration circuit.

In an embodiment, if the data operation signal is a multicast instruction, the multicast instruction carries identifiers of a plurality of target machine learning units that receive data; and the read/write processing circuit is specifically configured to send the data obtained by the arbitration circuit from the shared memory to the plurality of target machine learning units.

In an embodiment, if the data operation signal is a broadcast instruction, the read/write processing circuit is specifically configured to transfer the data obtained by the arbitration circuit from the shared memory to all machine learning units.

In an embodiment, the input data includes input neuron data and/or weight data; and the output data includes output neuron data.

In an embodiment, the data processing device is divided into at least one cluster, where each cluster includes a plurality of machine learning units, a transmission circuit, and at least one shared memory;

the transmission circuit further includes: a first type of direct memory access controller DMA connected to an arbitration circuit in the cluster and a shared memory in the cluster, and/or, a second type of DMA connected to the arbitration circuit in the cluster and shared memories in other clusters, where the first type of DMA is configured to control data interaction between the arbitration circuit in the cluster and the shared memory in the cluster; and the second type of DMA is configured to control data interaction between the arbitration circuit in the cluster and shared memories in other clusters, and control data interaction between the arbitration circuit in the cluster and an off-chip memory. ssss In an embodiment, the transmission circuit further includes: a first selection transmission circuit connected to the first type of DMA, and a second selection transmission circuit connected to the second type of DMA, where the first selection transmission circuit is configured to selectively connect a shared memory in a cluster where the first selection transmission circuit is located; and the second selection transmission circuit is configured to selectively connect shared memories in a cluster where the second selection transmission circuit is located and other clusters, and the off-chip memory.

In an embodiment, the transmission circuit further includes: a caching circuit connected to the arbitration circuit and the shared memory. The caching circuit is configured to temporarily store data obtained by the arbitration circuit from the shared memory, and temporarily store data written by the arbitration circuit to the shared memory.

In an embodiment, a transmission bandwidth between the transmission circuit and the shared memory is greater than a transmission bandwidth between the transmission circuit and the machine learning unit.

In an embodiment, the input data includes input neuron data and/or weight data; and the output data includes output neuron data.

An embodiment of the present disclosure provides a neural network operation device, where the operation device includes one or more computation devices in the Noc processing system. The neural network operation device is configured to obtain data to be operated and control information from other processing devices, execute a specified machine learning operation, and transfer an execution result to other processing devices through an I/O interface.

When the neural network operation device includes a plurality of the computation devices, the plurality of computation devices may be interconnected and transfer data to each other through a specific structure, where the plurality of computation devices are interconnected and transfer data to each other through a PCIE bus to support a larger-scale machine learning operation; the plurality of computation devices share a same control system or have respective control systems; the plurality of computation devices share a memory or have respective memories; and an interconnection mode of the plurality of computation devices is any interconnection topology.

An embodiment of the present disclosure provides a combined processing device, where the combined processing device includes the neural network operation device, a universal interconnection interface, and other processing devices. The neural network operation device interacts with the other processing devices to jointly complete operations specified by a user. The combined processing device may also include a storage device, where the storage device is connected to the neural network operation device and the other processing devices respectively, and the storage device is configured to store data of the neural network computation device and the other processing devices.

An embodiment of the present disclosure provides a neural network chip, where the chip includes the computation device in the NoC processing system, the neural network computation device, or the combined processing device.

An embodiment of the present disclosure provides a neural network chip package structure, where the package structure includes the neural network chip.

An embodiment of the present disclosure provides a board card, where the board card includes the neural network chip package structure.

An embodiment of the present disclosure provides an electronic device, where the electronic device includes the neural network chip or the board card.

It should be understood that the above general descriptions and the following detailed descriptions are only exemplary and illustrative, and are not intended to limit the present disclosure.

BRIEF DESCRIPTION OF THE DRAWINGS

The accompanied drawings herein are incorporated into the specification and constitute a part of the specification, illustrate embodiments that conform to the present disclosure, and are used together with the specification to explain principles of the present disclosure.

DETAILED DESCRIPTION OF THE EMBODIMENTS

The exemplary embodiments will be described in detail, and examples thereof are shown in the accompanied drawings. Unless otherwise indicated, identical numbers in different drawings indicate identical or similar elements. The implementation manners described in the following exemplary embodiments do not represent all implementation manners consistent with the present disclosure. On the contrary, the implementation manners are only examples of devices and methods which are consistent with some aspects of the present disclosure and specifically described in the appended claims.

With the continuous development of information technology, the demand for data access and data processing becomes higher, which leads to higher requirements for processors that process data and access data. For example, for a general-purpose processor, a multi-core processor composed of a plurality of general-purpose processor cores (such as CPU cores) has become a mainstream due to powerful parallel computation capabilities.

However, with continuous development of machine learning algorithms, machine learning chips with more architectures gradually come out. However, when these machine learning chips access or process data in the shared storage, the data access logic may be extremely complex, which further leads to inefficient data processing during machine learning.

Therefore, how to simplify logic of a machine learning chip on data access has become an urgent technical problem to be solved by current technicians.

To solve the above problem, the present disclosure provides the following technical solutions.

Figure 1:
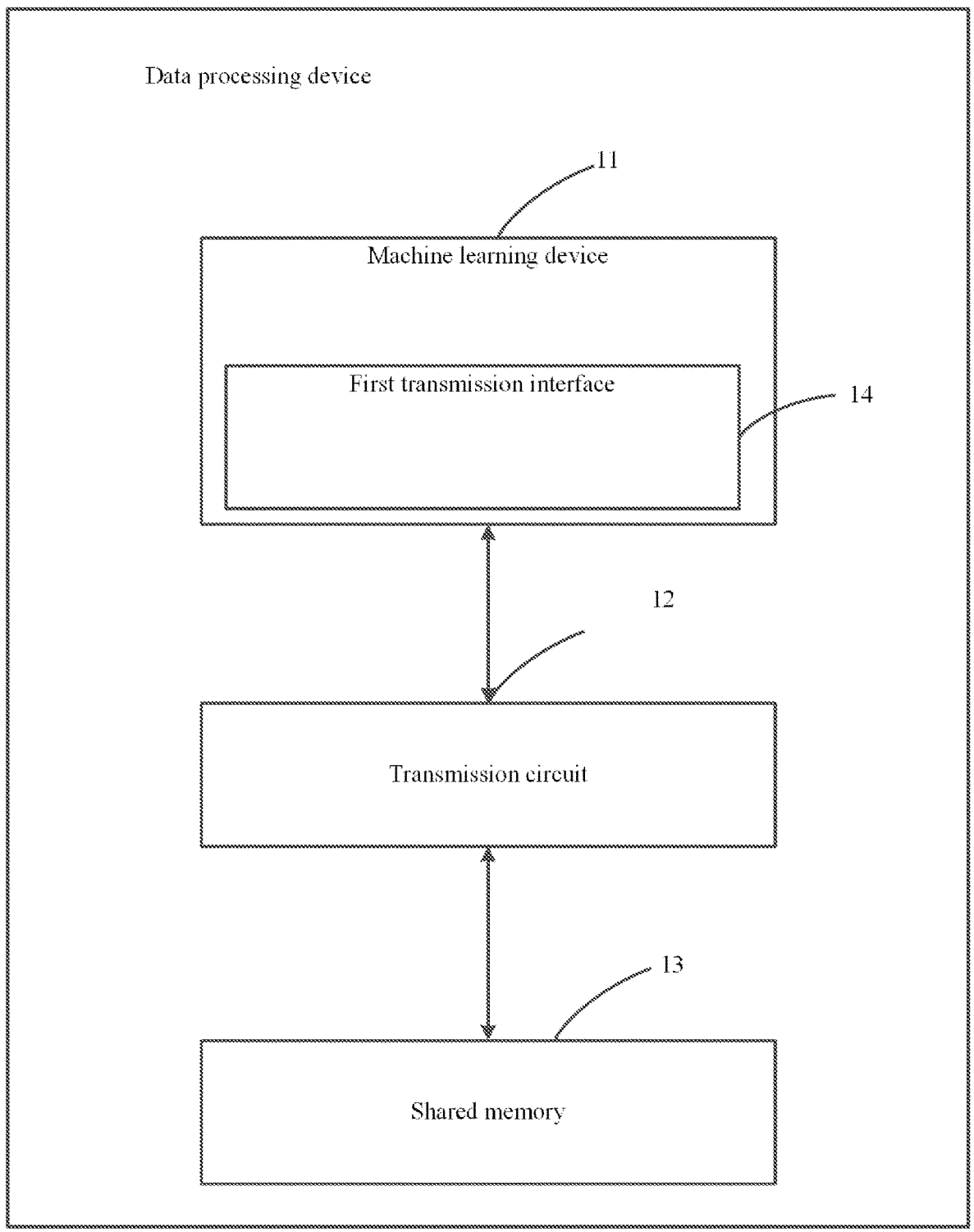
FIG. 1 is a schematic structural diagram of a data processing device according to an embodiment.

First, a data processing device used in the present disclosure will be introduced. As shown in FIG. 1, a data processing device provided. The data processing device may be implemented by software, hardware, or a combination of software and hardware. The data processing device is configured to process machine learning data. As shown in FIG. 1, the data processing device includes a machine learning device 11, a transmission circuit 12, and a shared memory 13. The machine learning device 11 is connected to the transmission circuit 12 through a first transmission interface 14, and the transmission circuit 12 is connected to the shared memory 13.

The transmission circuit 12 is configured to obtain input data required by the machine learning device from the shared memory 13 according to a data operation signal sent by the machine learning device, and return the input data to the machine learning device 11, where the data operation signal represents an operation mode for data in the shared memory.

Optionally, the machine learning device 11 is configured to perform a machine learning operation according to the input data to obtain output data. Optionally, the machine learning device 11 is further configured to transfer the output data to the shared memory 13 through the transmission circuit 12 for data storage. Specifically, when the machine learning device 11 is configured to perform a neural network operation, the device 11 may perform an artificial neural network operation according to input neuron data and weight data to obtain output neuron data, use the output neuron data as new input neuron data, and transfer the new input neuron data to the shared memory 13 through the transmission circuit 12 for data storage. It should be noted that the above machine learning device 11, the transmission circuit 12, the shared memory 13, and the first transmission circuit 14 may all be implemented by hardware circuits. For example, the transmission circuit 12 may be a broadcast bus, the shared memory 13 may be a non-volatile and/ or volatile memory, including but not limited to a random access memory (RAM), a scratchpad memory, and the like, and the first transmission interface may correspond to one or more data I/O (in/out) interfaces or I/O pins.

Optionally, the machine learning device 11 may include one or more first transmission interfaces 14. The first transmission interface 14 may be a sending interface or a receiving interface. When the first transmission interface 14 is a sending interface, the machine learning device 11 may send a data operation signal or data to the transmission circuit 12 connected to the sending interface; when the first transmission interface 14 is a receiving interface, the machine learning device 11 may receive data returned by the transmission circuit 12.

The data operation signal indicates that an operation performed on data in the shared memory 13. In an optional embodiment, the data operation signal may indicate performing a read or write operation on the data in the shared memory 13. Correspondingly, when the data operation signal sent by the machine learning device 11 is a read operation, the transmission circuit 12 may find data in a corresponding address from the shared memory 13, read the data, and then return the data to the at least one machine learning device 11; when the data operation signal sent by the machine learning device 11 is a write operation, the transmission circuit 12 may write the write data output by the machine learning device 11 into the shared memory 13.

The input data is data that the machine learning device 11 needs to input when performing a machine learning operation. The above data may be original data pre-stored in the shared memory 13, or may be data obtained from writing an intermediate result or a final result output by the machine learning device 11 when performing a machine learning operation into the shared memory 13.

Optionally, the above input data may include input neuron data and/or weight data, where the input neuron data and the weight data are data to be input by the machine learning device 11 during execution of an artificial neural network operation. The above output data may include output neuron data, where the output neuron data is an intermediate result or a final result output by the machine learning device 11 during execution of an artificial neural network operation.

It should be noted that the data processing device used in the present disclosure may be at least one of the following structural forms: the machine learning device 11 may be connected to a transmission circuit 12 through a plurality of first transmission interfaces 14, and then be connected to a shared memory 13 through the transmission circuit 12 to obtain the above data; optionally, the machine learning device 11 may also be connected to a plurality of transmission circuits 12 through a plurality of first transmission interfaces 14, and then be connected to a shared memory 13 through the transmission circuits 12 to obtain the above data; optionally, the machine learning device 11 may also be connected to a transmission circuit 12 through a plurality of first transmission interfaces 14, and then be connected to a plurality of shared memories 13 through the transmission circuit 12 to obtain the above data.

Optionally, when the machine learning device 11 performs an artificial neural network operation, for a multi-layer neural network operation (a forward operation or a backward operation), the machine learning device 11 may compute neuron data output by each layer of neural network, and specifically, may perform an operation set including a series of artificial neural network operations such as a product operation, a sum operation, a convolution operation, and an activation operation on a plurality of input neuron data corresponding to an input of each layer of neural network to obtain an operation result. After the machine learning device 11 obtains output neuron data of a current layer through the artificial neural network operation, the output neuron data may be used as input neuron data of a next layer of neural network for another artificial neural network operation, before which the output neuron data of the current layer may be written into the shared memory 13 through the transmission circuit 12 for storage, so that the machine learning device 11 may read the data at any time for an artificial neural network operation of the next layer.

The data processing device for performing machine learning operations provided in the above embodiment includes: a machine learning device, a transmission circuit connected through the first transmission interface on the machine learning device, and a shared memory connected to the transmission circuit. The transmission circuit is configured to obtain input data required by the machine learning device from the shared memory according to a data operation signal sent by the machine learning device, and return the input data to the machine learning device; in the above data operation process, since there is a large amount of data sharing during execution of the machine learning operation, a corresponding transmission circuit is arranged in the data processing device used in the present disclosure to allow the machine learning device to read and write data from the shared memory. In a direct data access process of a traditional CPU to a memory, blockage and deadlock may be caused by the complex parallel data access logic when CPU performs a parallel operation, while the data processing device used in the present disclosure may simplify the data access logic of a machine learning device to a shared memory, which improve the data access efficiency and further improve the machine learning operation speed of a machine learning device.

Figure 1A:
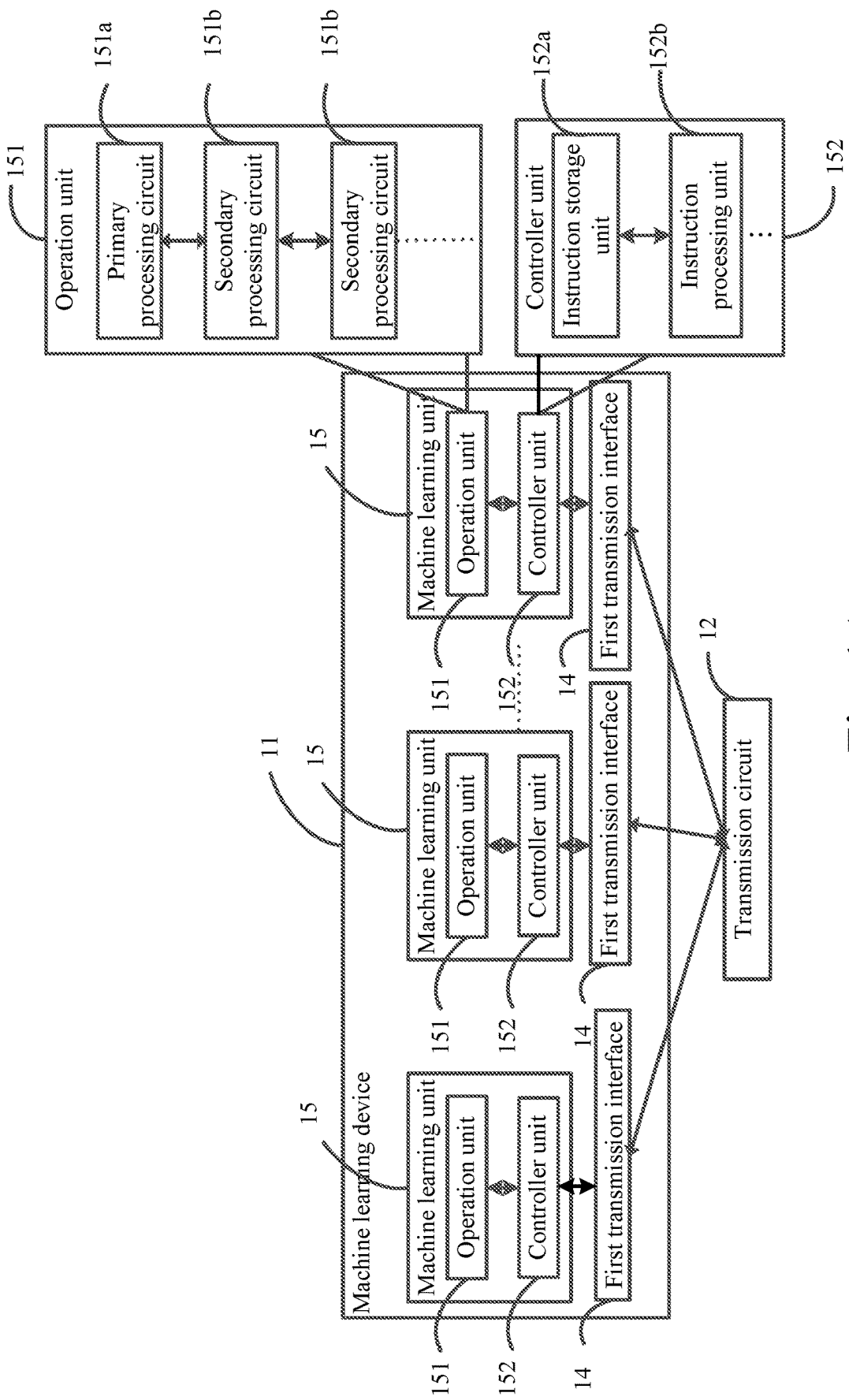
FIG. 1A is a schematic structural diagram of a machine learning device according to an embodiment.

FIG. 1A is a schematic structural diagram of a machine learning device according to an embodiment of the present disclosure. On the basis of the above embodiments and referring to FIG. 1A, the machine learning device 11 includes at least one machine learning unit 15. The machine learning unit 15 includes: at least one operation unit 151, and a controller unit 152 connected to the operation unit 151; the operation unit 151 includes a primary processing circuit 151a and a plurality of secondary processing circuits 151b, where the operation unit 151 is connected to the transmission circuit 12 through a first transmission interface 12.

The above controller unit 152 is configured to send a data operation signal and output data to the transmission circuit 12 through a sending interface in the first transmission interface 14, receive input data obtained by the transmission circuit 12 from the shared memory 13 through a receiving interface in the first transmission interface 14, and send the input data to the primary processing circuit 151a and/or the secondary processing circuits 151b; the primary processing circuit 151a is configured to distribute the input data to a plurality of secondary processing circuits 151b; the plurality of processing circuits 151b are configured to perform an intermediate operation in parallel according to data transferred by the primary processing circuit 151a to obtain a plurality of intermediate results, and send the plurality of intermediate results to the primary processing circuit 151a; and the primary processing circuit 151a is further configured to perform subsequent processing on the plurality of intermediate results to obtain a computation result.

Optionally, the machine learning device 11 may also include a machine learning unit 15. This machine learning device 11 is suitable for a situation where a small number of neurons are included in a neural network structure involved when the machine learning device 11 performs an artificial neural network operation, and may use only one machine learning unit 15 to complete an entire neural network operation. The specific operation process includes: the machine learning unit 15 may perform an artificial neural network operation according to input neuron data and weight data corresponding to each layer of neurons in the neural network to obtain output neuron data corresponding to each layer of neurons, and use the output neuron data as new input neuron data for a neural network operation of a next layer until the entire neural network operation is completed and the final operation result is obtained. In the process, the machine learning device 11 may transfer output neuron data obtained by the machine learning unit 15 in an operation of each layer, or the final operation result is sent to the shared memory 13 through the transmission circuit 12 for data storage.

Optionally, the machine learning device 11 may also include a plurality of machine learning units 15. This machine learning device 11 is suitable for a situation where a large number of neurons are included in a neural network structure involved when the machine learning device 11 performs an artificial neural network operation. For example, for the operation of a multi-layer neural network, in a neural network operation of the forward operation of a certain layer, when there are a large number of neurons in this layer, in an optional computation manner, the above machine learning device 11 may use a plurality of machine learning units 15 to perform a computation in parallel on output neuron data of part of neurons in a layer of neural network, respectively. For example, a machine learning device 11 includes 4 machine learning units 15, and a layer of neural network has 100 neurons, then the machine learning device 11 may allocate each machine learning unit 15 to process 25 neurons, and output corresponding output neuron data. The above computation manner of performing a neural network computation in parallel layer by layer may realize parallel processing of neural network computation, which improves the processing efficiency.

Optionally, in the above machine learning unit 15, the controller unit 152 may include an instruction storage unit 152a and an instruction processing unit 152b. Optionally, the controller unit 152 may include a plurality of instruction storage units 152a and a plurality of instruction processing units 152b.

The instruction storage unit 152a is configured to store all operation instructions involved in a machine learning operation performed by the machine learning unit 15 and corresponding data read/write operation instructions when a read/write data operation is required. The instruction processing unit 152b is configured to process all the instructions in the instruction storage unit 152a. Specifically, the instruction processing unit 152b sends an operation instruction in the instruction storage unit 152a to the operation unit 151 to allow the operation unit 151 to perform a corresponding operation operation according to the operation instruction, parses a data read/write operation instruction in the instruction storage unit 152a to obtain a data operation signal, and sends the data operation signal to the first transmission interface 14 to allow the first transmission interface 14 to read/write data from the shared memory 13 through the data operation signal.

Optionally, in the above machine learning unit 15, the controller unit 151 may include a primary processing circuit 151a and a secondary processing circuit 151b. Optionally, the operation unit 151 may include a primary processing circuit 151a and a plurality of secondary processing circuits 151b. This structural design is suitable for application scenarios where a large amount of data needs to be processed, especially for scenarios where a large number of parallel operations are involved in the machine learning operation process. Therefore, the operation structure provided in the present disclosure may increase the operation speed, save operation time, and thus reducing power consumption.

It should be noted that each secondary processing circuit 151b in the above structure may directly perform a parallel operation according to the input data sent by the primary processing circuit 151a. Optionally, each secondary processing circuit 151b may directly perform a parallel operation according to the input data sent by the controller unit 152.

Based on the situation where each operation unit 151 has a primary processing circuit 151a and a plurality of secondary processing circuits 151b, the primary processing circuit 151a and the plurality of secondary processing circuits 151b in each operation unit 151 may have identical or different structures. The structure of the primary processing circuit 151a and the secondary processing circuits 151b may include at least one of an H-type, a systolic array type, and a tree structure.

The machine learning device in the above embodiment includes at least one machine learning unit, where each machine learning unit includes: at least one operation unit, and a controller unit connected to the operation unit; at the same time, the operation unit includes a primary processing circuit and a plurality of secondary processing circuits, where the operation unit is connected to the transmission circuit through the first transmission interface. The controller unit in the above machine learning device is configured to send a data operation signal and output data to the transmission circuit through a sending interface in the first transmission interface, receive input data obtained by the transmission circuit from the shared memory through the receiving interface in the first transmission interface, and send the input data to the primary processing circuit and/or the secondary processing circuits. The above machine learning device includes a primary processing circuit and a plurality of secondary processing circuits. The primary processing circuit may simultaneously distribute obtained data to the plurality of secondary processing circuits to allow the plurality of secondary processing circuits to perform a parallel operation, and return intermediate operation results to the primary processing circuit for operations to complete a machine learning operation. Compared with the traditional processors used for machine learning operations in which there is only one method for a processing circuit to operate data, the machine learning device provided in the present disclosure processes and operates data faster.

Figure 2:
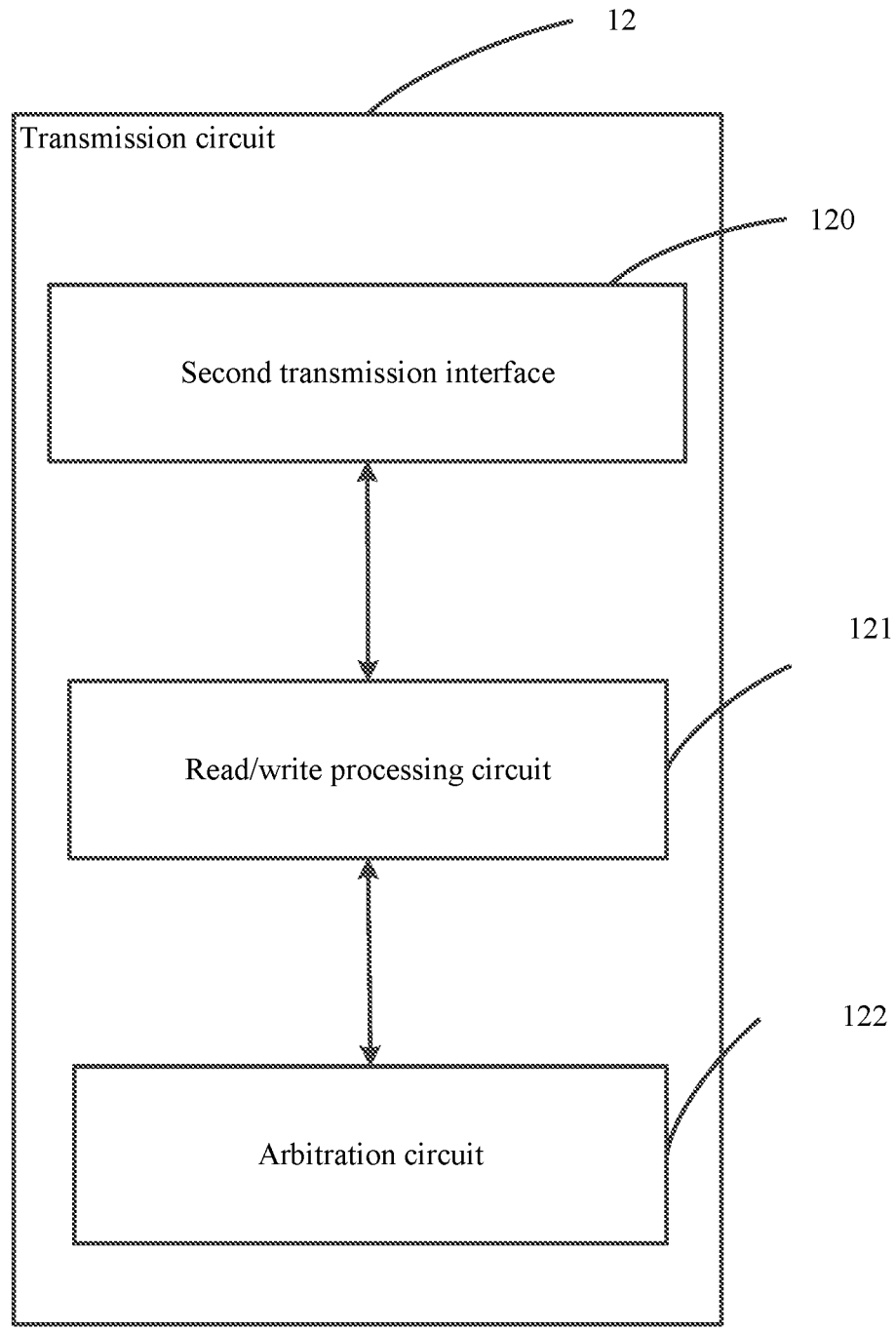
FIG. 2 is a schematic structural diagram of a transmission circuit according to an embodiment.

FIG. 2 is a schematic structural diagram of a transmission circuit according to an embodiment. Referring to FIG. 2, the transmission circuit 12 includes: a second transmission interface 120, at least one read/write processing circuit 121 connected to the second transmission interface 120, and an arbitration circuit 122 connected to the read/write processing circuit 121; the at least one machine learning unit 15 is connected to the transmission circuit 12 through a connection between the first transmission interface 14 and the second transmission interface 120.

The read/write processing circuit 121 is configured to receive the data operation signal sent by the at least one machine learning unit 15 through the first transmission interface 14 and the second transmission interface 120, transmit the data operation signal to the arbitration circuit 122, and transfer the data read from the shared memory 13 to the at least one machine learning unit 15 through the second transmission interface 120; and the arbitration circuit 122 is configured to arbitrate the data operation signal received from the read/write processing circuit 121 according to a preset arbitration rule, and perform an operation on data in the shared memory 13 according to the data operation signal that has been successfully arbitrated.

Optionally, the transmission interface 12 may include a plurality of second transmission interfaces 120, where the second transmission interface 120 may be a sending interface or a receiving interface. When the second transmission interface 120 is a sending interface, the transmission circuit 12 may send data to a machine learning unit 15 connected to the sending interface; when the second transmission interface 120 is a receiving interface, the transmission circuit 12 may receive a data operation signal and/or data sent from the machine learning unit 15 to the receiving interface. Optionally, the sending interface of the second transmission interface 120 is connected to the receiving interface in the first transmission interface 14, and the receiving interface of the second transmission interface 120 is connected to the sending interface in the first transmission interface 14.

Figure 2A:
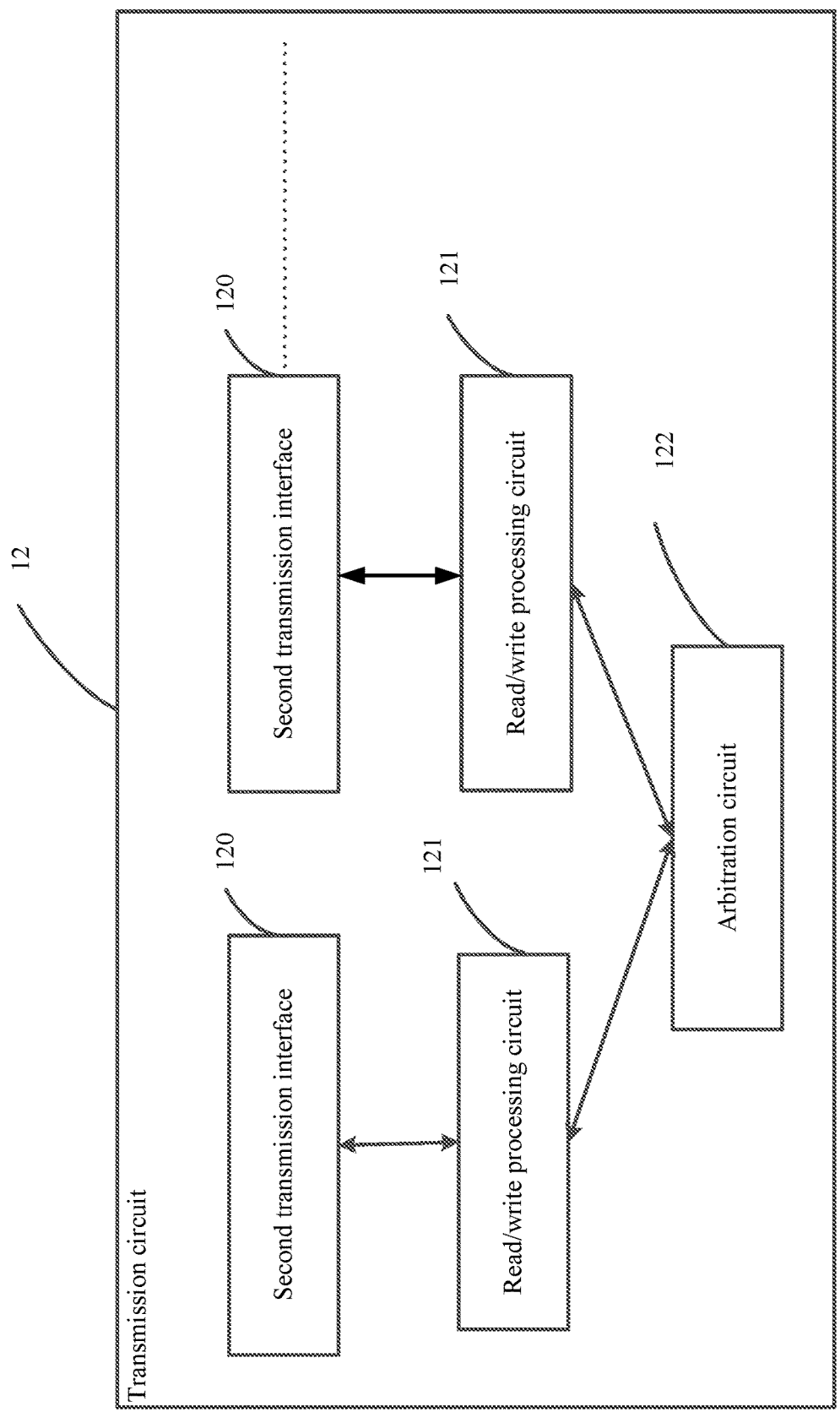
FIG. 2A is a schematic structural diagram of a transmission circuit according to an embodiment.
Figure 2B:
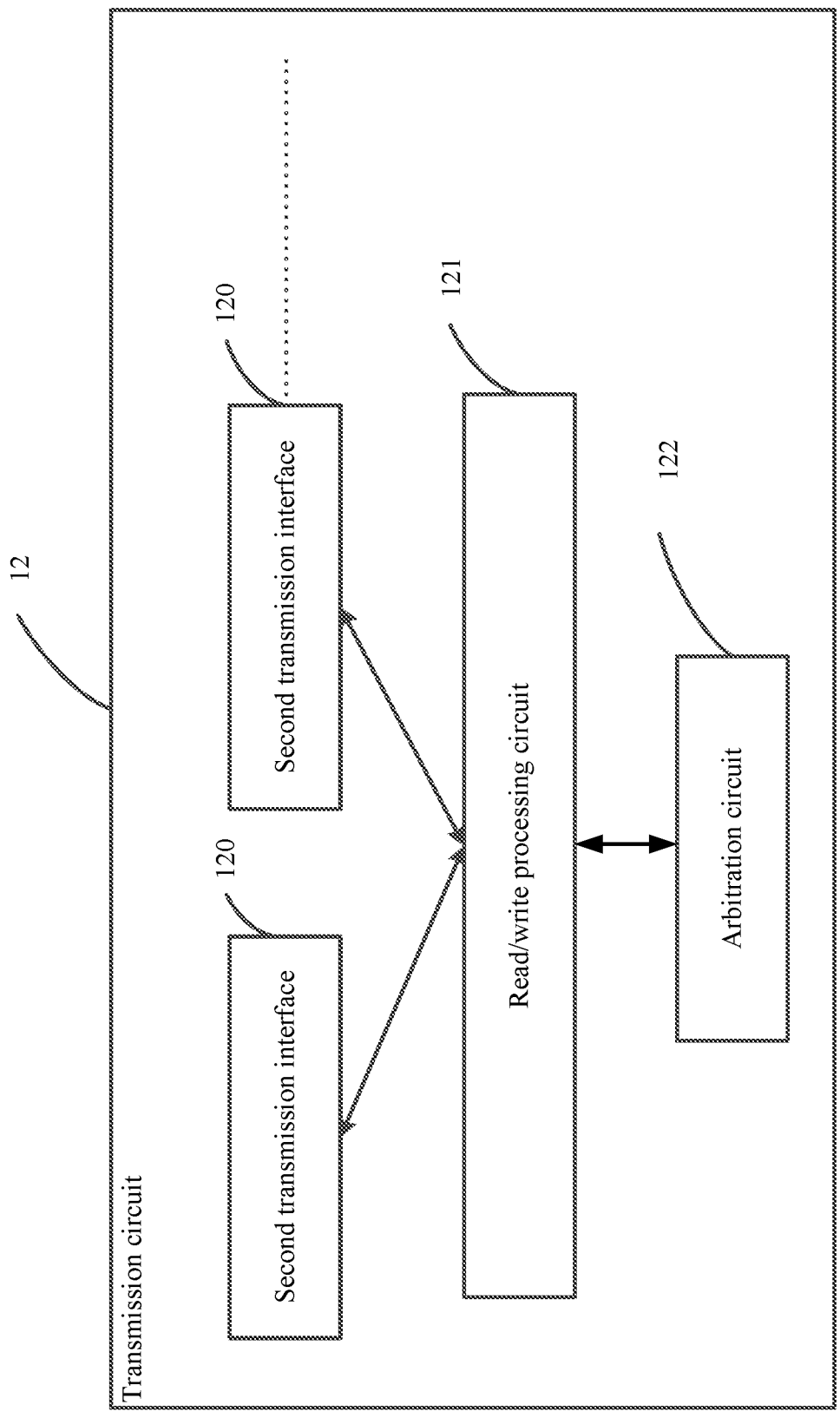
FIG. 2B is a schematic structural diagram of a transmission circuit according to an embodiment.

Optionally, referring to FIG. 2A, the transmission circuit 12 may include a plurality of read/write processing circuits 121, and input ends of the plurality of read/write processing circuits 121 may be connected with the plurality of second transmission interfaces 120 in a one-to-one correspondence. Optionally, referring to FIG. 2B, the transmission circuit 12 may only include one read/write processing circuit 121, and the input end of the read/write processing circuit 121 may be connected with the plurality of second transmission interfaces 120 in a one-to-many correspondence. In other words, one read/write processing circuits 121 is correspondingly connected to the plurality of second transmission interfaces 120.

Optionally, when the plurality of read/write processing circuits 121 are connected to a plurality of second transmission interfaces 120 in a one-to-one correspondence, each read/write processing circuit 121 may transfer data to one or more machine learning units 15 through a second transmission interface connected to the same read/write processing circuit 120 ; when the above one read/write processing circuit 121 is connected to a plurality of second transmission interfaces 120 in a one-to-many correspondence, the read/write processing circuit 121 may transfer data to a plurality of machine learning units 15 through a plurality of second transmission interfaces 120 connected to the same read/write processing circuit, or transfer data to one machine learning unit 15 through one of the second transmission interfaces 120.

Optionally, the structure of the above transmission circuit 12 may include an arbitration circuit 122, and the input end of the arbitration circuit 122 may be connected to a plurality of read/write processing circuits 121. An output end of the arbitration circuit 122 is connected to the shared memory 13, or may be connected to other storage devices or control devices.

It can be seen from the above embodiment that the transmission circuit 12 used in the present disclosure may include a plurality of read/write processing circuits 121. Correspondingly, types of the plurality of read/write processing circuits 121 may be identical or different. In the following embodiments, modes of data transfer will be specifically described according to types of the read/write processing circuits 121 and types of data signals received by the read/write processing circuits 121.

Specifically, the read/write processing circuit 121 includes at least one of the following processing circuits: a unicast read processing circuit, a unicast write processing circuit, and a broadcast processing circuit; the data operation signal includes at least one of the following: a unicast read request, a unicast write request, a unicast read instruction, a unicast write instruction, a multicast instruction, and a broadcast instruction, where A unicast-type processing circuit is configured to process a unicast-type signal. For example, the unicast read processing circuit in the above embodiment may process a corresponding unicast read request or a unicast read instruction, and the unicast write processing circuit may process a corresponding unicast read request or a unicast read instruction. Correspondingly, a multicast-type processing circuit is configured to process a multicast-type or broadcast-type signal. For example, the broadcast-type processing circuit in the above embodiment is configured to process a multicast-type or broadcast-type signal.

It should be noted that if the data operation signal is an instruction-type signal, which is the unicast read instruction, the unicast write instruction, the multicast instruction, or the broadcast instruction in this embodiment, the read/write processing circuit 121 is specifically configured to parse the instruction-type signal to generate a request-type signal and send the request-type signal to the arbitration circuit 122; if the data operation signal is a request-type signal, which is the unicast read request or the unicast read request in this embodiment, the read/write processing circuit 121 is configured to perform a temporary storage operation on the request-type signal and send the request-type signal to the arbitration circuit 122.

Optionally, if the data operation signal is a multicast instruction and the multicast instruction carries identifiers of a plurality of target machine learning units that need to receive data, when the read/write processing circuit 121 in the transmission circuit 12 receives a multicast instruction, the read/write processing circuit 121 may identify a plurality of target machine learning units according to the identifiers carried in the multicast instruction, and finally send data to be returned to a plurality of identified target machine learning units.

Optionally, if the data operation signal is a broadcast instruction, the broadcast instruction may not carry any identifier of target machine learning units that receive the data; however, when the read/write processing circuit 121 receives a broadcast instruction, the read/write processing circuit 121 may transfer data obtained by the arbitration circuit 122 from the shared memory 13 to all the machine learning units 15 included in the machine learning device 11.

Optionally, the preset arbitration rule is used to enable the arbitration circuit 122 to determine priorities of a plurality of data operation signals according to a certain rule, so that the arbitration circuit 122 may determine data operation signals that have been successfully arbitrated according to the priority of each data operation signal. For example, if a transmission rate of a data operation signal sent by a 1# read/write processing circuit 121 is higher than a transmission rate of a data operation signal sent by a 2# read/write processing circuit 121, the arbitration circuit 122 may set a priority of the data operation signal with a higher transmission rate to a high priority and set a priority of the data operation signal with a low transmission rate to a low priority, then the arbitration circuit 122 may select a data operation signal with high priority according to the above priority to obtain data from the shared memory 13 according to the data operation signal.

In the above embodiment, the transmission circuit includes: a second transmission interface, at least one read/write processing circuit connected to the second transmission interface, an arbitration circuit connected to the read/write processing circuit. The read/write processing circuit 121 is configured to receive a data operation signal transmitted by at least one machine learning unit through the first transmission interface and the second transmission interface, transmit the data operation signal to the arbitration circuit, and transfer data read from the shared memory to the at least one machine learning unit through the second transmission interface; and the arbitration circuit is configured to arbitrate the data operation signal received from the at least one read/write processing circuit according to a preset arbitration rule, and perform an operation on data in the shared memory according to the data operation signal that has been successfully arbitrated. In the above transmission circuit, a plurality of read/write processing circuits are connected to the machine learning device through a plurality of second transmission interfaces, and the arbitration circuit performs arbitration, which realizes effective data transfer and avoids data conflict and blockage caused by the machine learning device simultaneously sending a plurality of data operations; in addition, the transmission circuit in this embodiment may process various types of instructions or requests, which greatly improves the application range of the data processing device.

Figure 3:
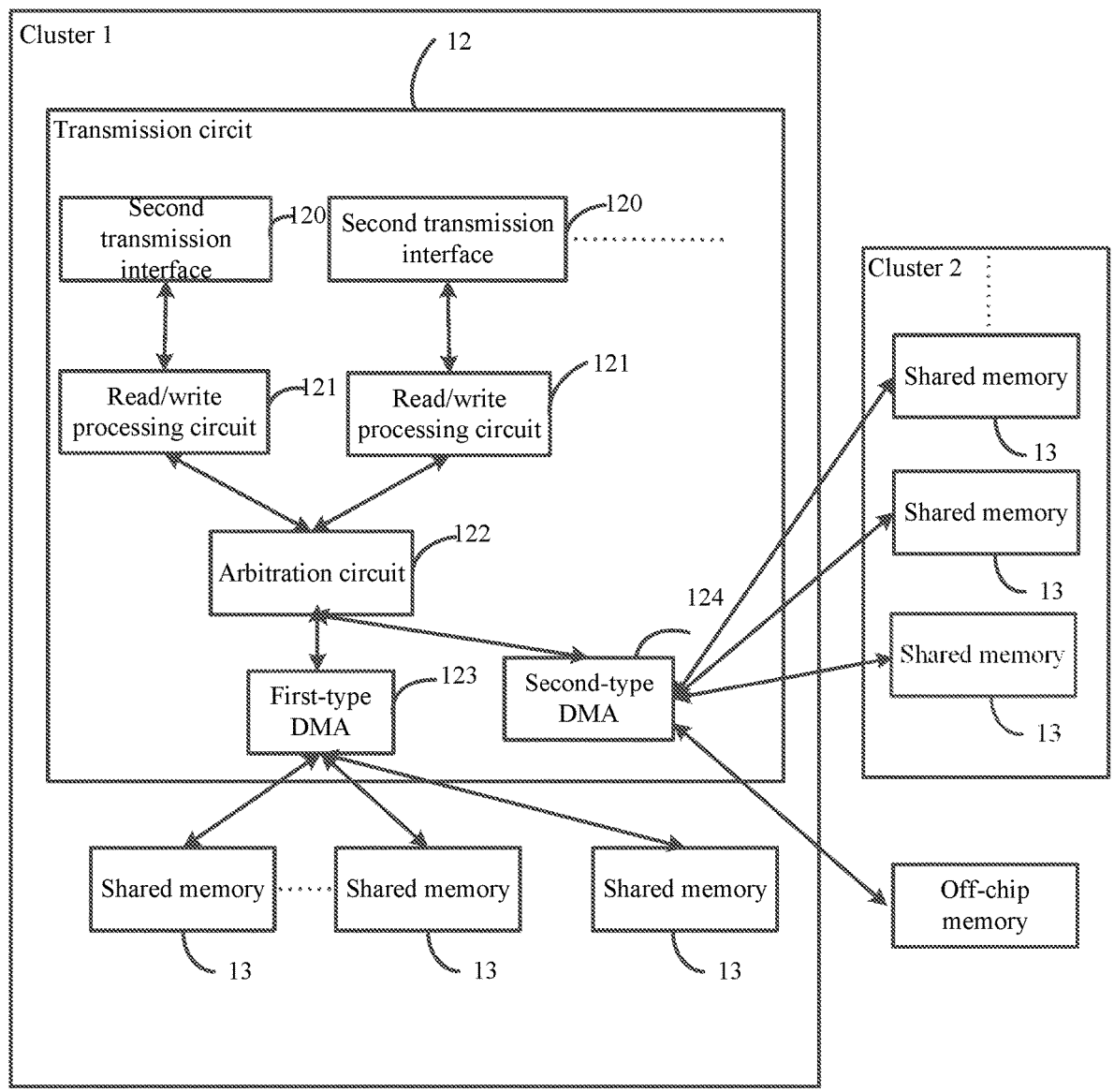
FIG. 3 is a schematic structural diagram of a transmission circuit in a cluster according to an embodiment.

In an embodiment, the data processing device in the above embodiment may be divided into at least one cluster, and each cluster includes a plurality of machine learning units 15, a transmission circuit 12, and at least one shared memory 13; in an application scenario where a plurality of clusters exist, referring to FIG. 3, the transmission circuit 12 further includes: a first type of direct memory access controller DMA123 connected to an arbitration circuit in a same cluster and a shared memory 13 in the same cluster, and/or, a second type of DMA124 connected to the arbitration circuit in a same cluster and shared memories 13 in other clusters.

The first type of DMA123 is configured to control data interaction between the arbitration circuit 122 in the cluster and the shared memory 13 in the cluster; the second type of DMA is configured to control data interaction between the arbitration circuit 122 in the cluster and shared memories 13 in other clusters, and control data interaction between the arbitration circuit 122 in the cluster and an off-chip memory.

Optionally, functions of the first type of DMA123 and the second type of DMA124 are mainly to control the arbitration circuit 122 to be connected to at least one shared memory 13, and to quickly read or write data from the at least one connected shared memory 13.

Figure 4:
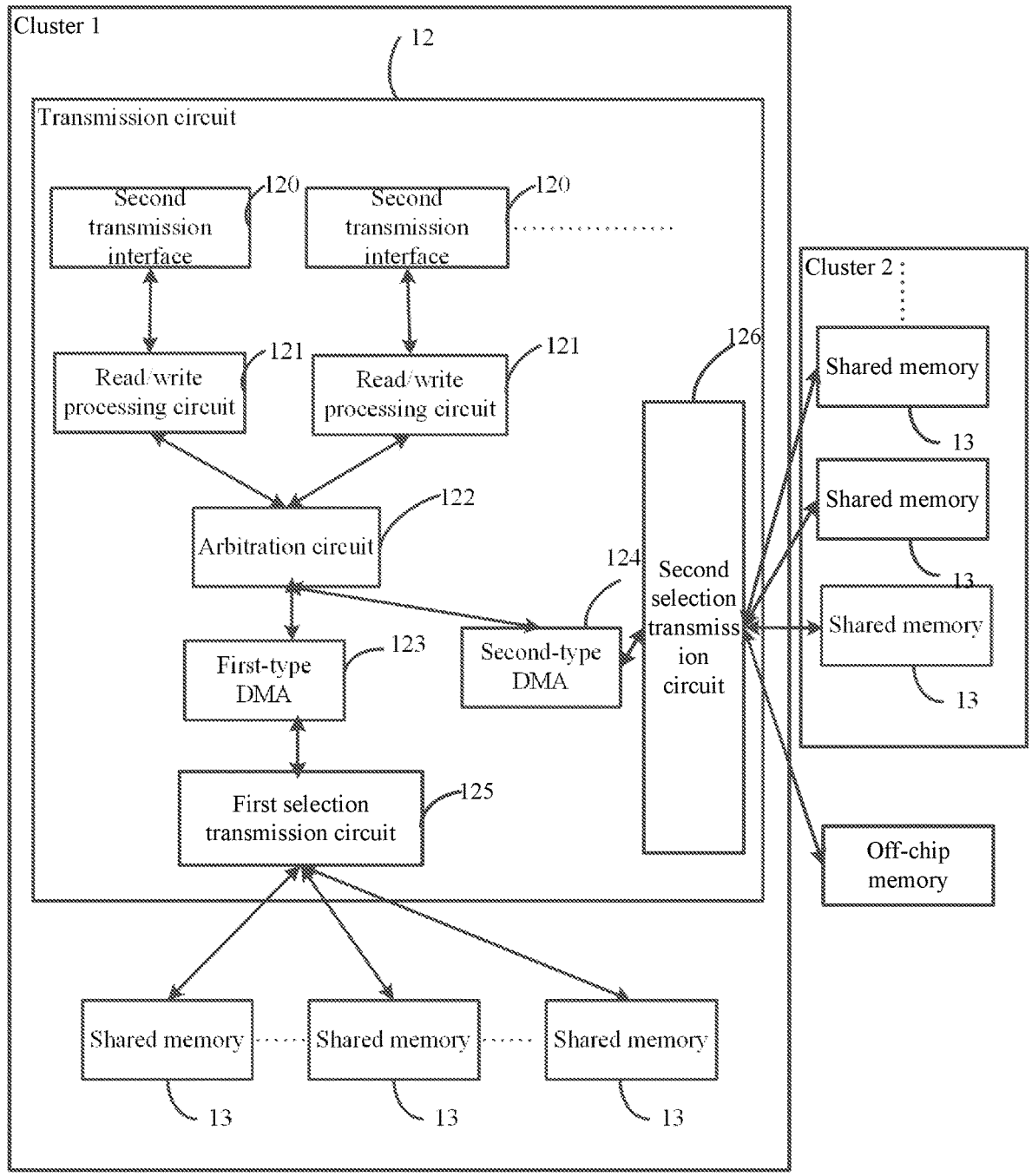
FIG. 4 is a schematic structural diagram of another transmission circuit in a cluster according to an embodiment.

When there is the first type of DMA123 or the second type of DMA124 in the transmission circuit, referring to FIG. 4, the transmission circuit 12 used in the present disclosure may further include: a first selection transmission circuit 125 connected to the first type of DMA123 and a second selection transmission circuit 126 connected to the second type of DMA. The first selection transmission circuit 125 is configured to be selectively connected to the shared memory 13 in a same cluster, and the second selection transmission circuit 126 is configured to be selectively connected to the shared memories 13 in a same cluster and other clusters, and the off-chip memory.

Optionally, the first selection transmission circuit 125 and the second selection transmission circuit 126 may be circuits of types such as crossbar switches, toggle switches, etc., and may control whether the circuits are connected or not by setting an on-off current or an on-off signal, which is not limited in the present disclosure.

Figure 5:
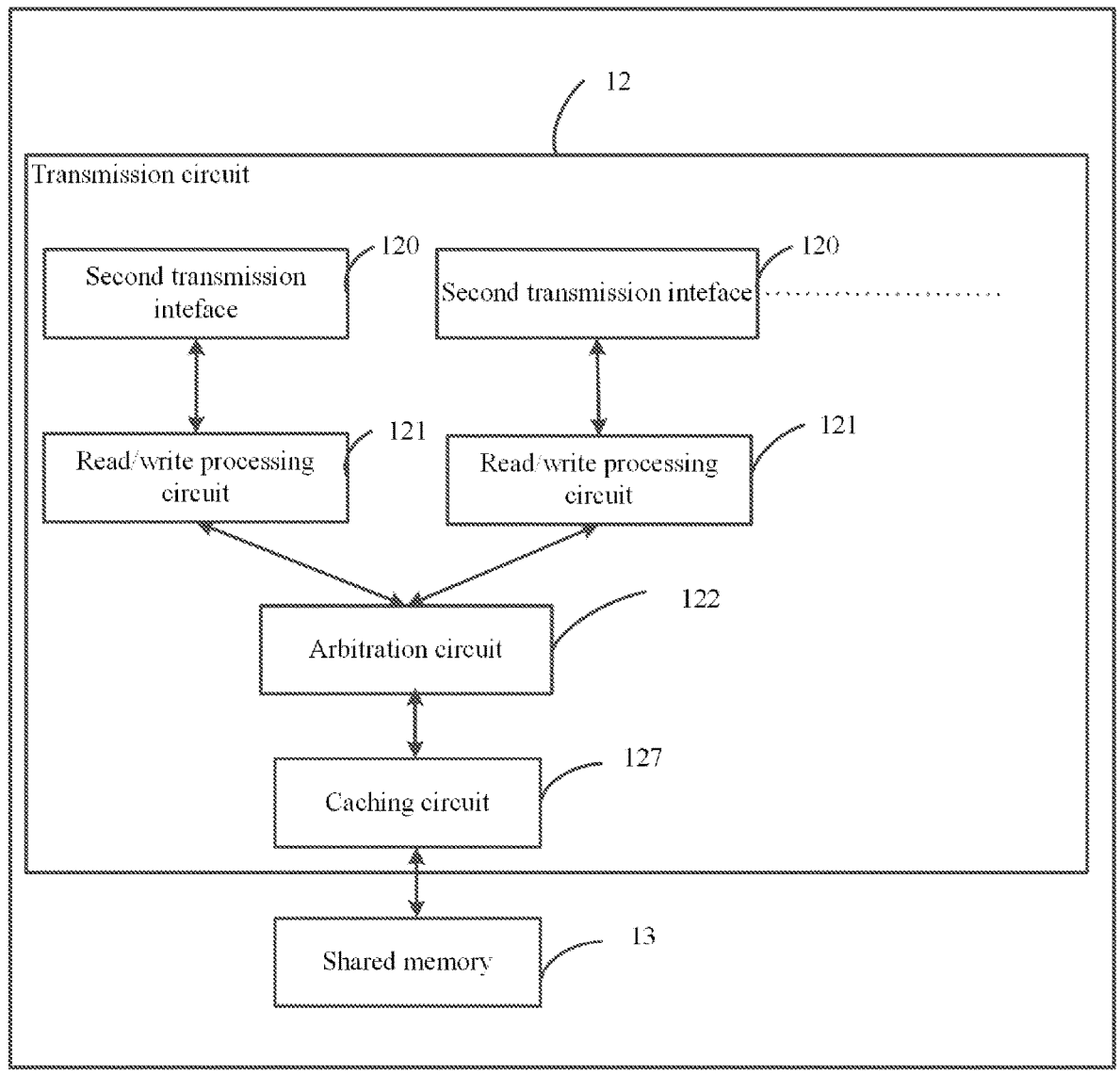
FIG. 5 is a schematic structural diagram of another transmission circuit according to an embodiment.

Optionally, referring to FIG. 5, when the transmission circuit 12 writes data to the shared memory 13, or the shared memory 13 returns the read data to the transmission circuit 12, the transmission circuit 12 may first temporarily store data to be written or the data to be returned for processing. Therefore, under such use requirements, the transmission circuit 12 used in the present disclosure may further include: a cache circuit 127 connected to the arbitration circuit 122 and the shared memory 13. The cache circuit is configured to temporarily store data obtained from the shared memory 13 by the arbitration circuit 122 and data written to the shared memory 13 by the arbitration circuit 122.

Optionally, the cache circuit 127 is configured to provide a buffer for data exchange. The cache circuit may be a random access memory (RAM), which is a prior art and will not be further described herein.

For the data processing device used in the present disclosure, data transmission bandwidths between circuits can be different. Optionally, the transmission bandwidth between the transmission circuit 12 and the shared memory 13 is greater than the transmission bandwidth between the transmission circuit 12 and the machine learning unit 15.

For example, if a machine learning device 11 includes N (N is an integer greater than or equal to 1) machine learning units 15, a transmission circuit 12, and a shared memory 13, and a bandwidth between the transmission circuit 12 and each machine learning unit 15 is M, a bandwidth between a broadcast processing circuit in the transmission circuit 12 and the shared memory 13 can be set to M*N. An advantage of this design is to avoid conflicts in extreme situations. For example, when a plurality of machine learning units 15 simultaneously send broadcast instructions to the transmission circuit 12, and the arbitration circuit 122 in the transmission circuit 12 sends the instructions to the shared memory 13 in order, conflicts may be avoided because of the sufficient bandwidth. In addition, after the arbitration circuit 122 in the transmission circuit 12 selects a broadcast instruction with a higher priority for processing according to the preset arbitration rule, the arbitration circuit 122 can proceed to process another broadcast instruction while waiting for the shared memory 13 to return data. The design accelerates data processing and effectively utilizes the data transmission bandwidth. It should be noted that, in the design of an actual circuit, the bandwidth between the transmission circuit 12 and the shared memory 13 can be twice, 4 times, 6 times, etc., the bandwidth between the transmission circuit 12 and each machine learning unit 15, as long as the bandwidth is greater than the bandwidth between the transmission circuit 12 and each machine learning unit 15, which is not limited herein.

The present disclosure further provides a neural network operation device which includes one or more computation devices mentioned in the present disclosure. The neural network operation device is configured to obtain data to be operated and control information from other processing devices, perform a specified neural network operation, and send an execution result to a peripheral apparatus through an I/O interface. The peripheral apparatus may include a camera, a monitor, a mouse, a keyboard, a network card, a WIFI interface, a server, and the like. When more than one of the above computation devices are included, the computation devices may be interconnected and transfer data to each other through a specific structure. For example, the computation devices may be interconnected and transfer data via a PCIE bus to support neural network operations with a larger scale. In this case, the computation devices may share the same control system, or may have separate control systems. The computation devices may share a memory, or each accelerator may have separate memories. In addition, an interconnection method of the computation devices may be any interconnection topology.

The neural network operation device has good compatibility and may be connected to various types of servers through a PCIE interface.

Figure 6:
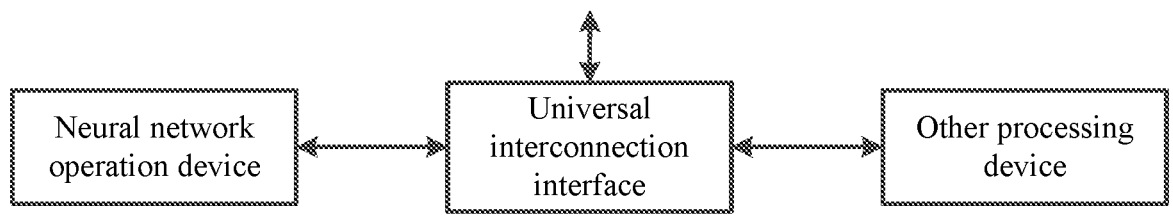
FIG. 6 is a schematic structural diagram of a combined processing device according to an embodiment.

The present disclosure also provides a combined processing device, where the device includes the neural network operation device, a universal interconnection interface, and other processing devices. The neural network operation device interacts with other processing devices to perform operations specified by users. FIG. 6 is a schematic diagram of the combined processing device.

The other processing devices include at least one or more of a general-purpose/special-purpose processors such as a central processing unit (CPU), a graphics processing unit (GPU), a neural network processor, and the like. A count of processors included in the other processing devices is not limited herein. The other processing devices may serve as an interface that connects the neural network operation device to external data and control, including data moving, and may perform the basic control such as starting and stopping the neural network operation device. The other processing devices may also cooperate with the neural network operation device to complete operation tasks.

The universal interconnection interface may be configured to transfer data and control instructions between the neural network operation device and the other processing devices. The neural network operation device may obtain required input data from the other processing devices and write the data in an on-chip storage device of the neural network operation device. The neural network operation device may obtain control instructions from the other processing device, and write the control instructions in an on-chip control cache of the neural network operation device. The neural network operation device may further read data stored in a storage module of the neural network operation device and transfer the data to the other processing devices.

Figure 7:
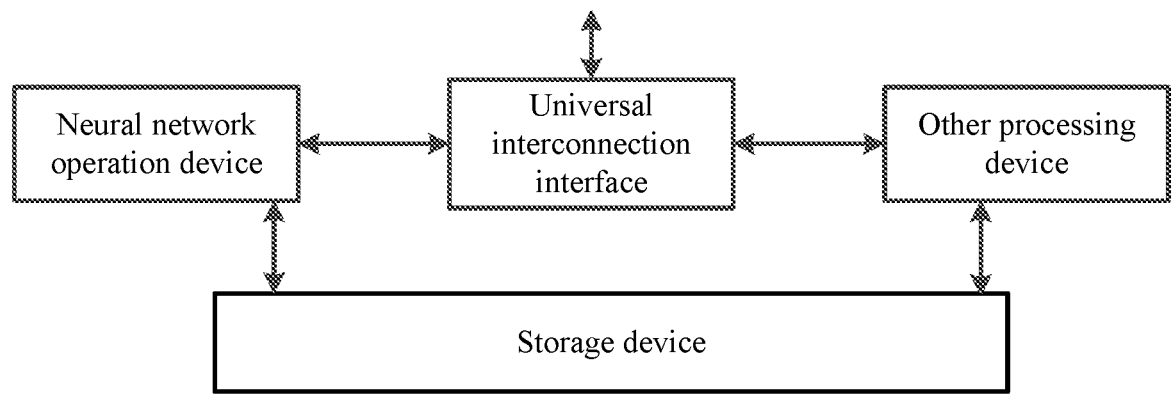
FIG. 7 is a schematic structural diagram of a combined processing device according to another embodiment.

Optionally, as shown in FIG. 7, the structure may further include a storage device, where the storage device is connected to the neural network operation device and the other processing devices respectively, and the storage device is configured to store data of the neural network computation device and the other processing devices. The storage device is configured to store data of the neural network operation device and the other processing devices, and is particularly suitable for a case where data to be operated cannot be completely stored in an internal memory of the neural network operation device or the other processing devices.

The combined processing device may be used as an SOC (System on Chip) of a device such as a mobile phone, a robot, a drone, a video surveillance device, and the like, which may effectively reduce the core area of a control part, increase the processing speed, and reduce the overall power consumption. In this case, a universal interconnection interface of the combined processing device may be connected to some components of the device. The components may include a camera, a monitor, a mouse, a keyboard, a network card, and a WIFI interface.

In some embodiments, the present disclosure provides a chip which includes the above neural network computation device or the combined processing device.

In some embodiments, the present disclosure provides a chip package structure which includes the above chip.

Figure 8:
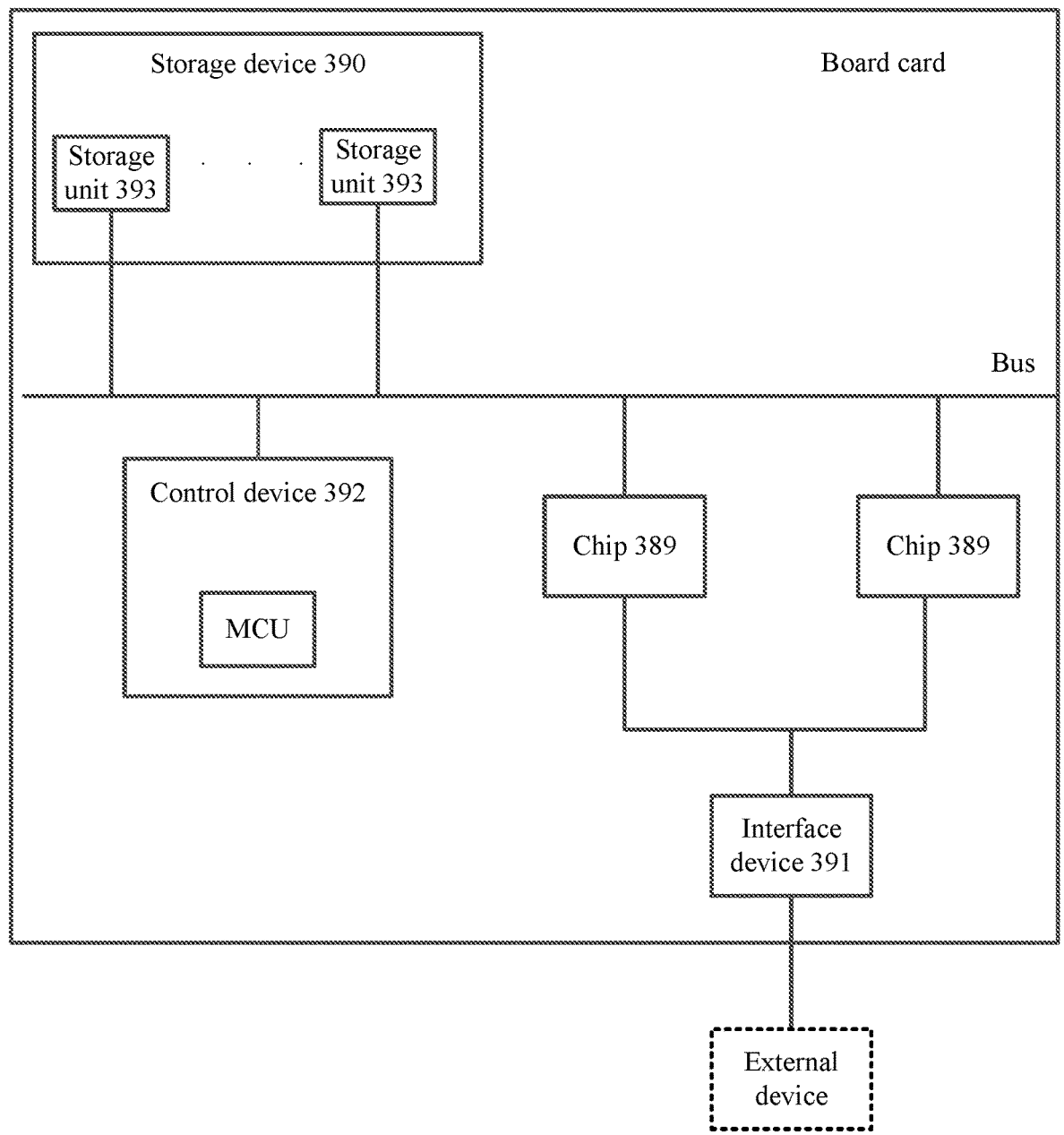
FIG. 8 is a schematic structural diagram of a board card according to an embodiment.

In some embodiments, the present disclosure provides a board card which includes the above chip package structure. FIG. 8 shows a board card which includes the above chip 389 and other supporting components, where the supporting components include and are not limited to: a storage device 390, an interface device 391, and a control device 392;

the storage device 390 is connected to the chip in the chip package structure through a bus for storing data. The storage device may include a plurality of clusters of storage units 393. Each cluster of the storage units is connected to the chip through a bus. It may be understood that each cluster of the storage units may be DDR SDRAMs (Double Data Rate Synchronous Dynamic Random Access Memory).

DDR may double the speed of SDRAM without increasing a clock frequency. DDR allows data to be read on rising and falling edges of a clock pulse. A speed of DDR is twice that of standard SDRAM. In an embodiment, the storage device may include four clusters of the storage units. Each cluster of the storage units may include a plurality of DDR4 particles (chips). In an embodiment, the chip may include four 72-bit DDR4 controllers, where 64 bits in the 72-bit DDR4 controller are used for data transfer and 8 bits are used for ECC verification. It may be understood that when DDR4-31200 particles are used in each cluster of the storage units, a theoretical bandwidth of data transfer may reach 251600 MB/s.

In an embodiment, each cluster of the storage units includes a plurality of DDR SDRAMs arranged in parallel. DDR may transfer data twice in one clock cycle. A controller for controlling the DDR is arranged in the chip to control data transfer and data storage of each storage unit.

The interface device is electrically connected to the chip in the chip package structure. The interface device is configured to implement data transfer between the chip and an external device (such as a server or a computer). For example, in an embodiment, the interface device may be a standard PCIE interface. For example, data to be processed is transferred from the server to the chip through a standard PCIE interface to realize data transfer. Optionally, when a PCIE 3.0×16 interface is used for transfer, a theoretical bandwidth may reach 116000 MB/s. In another embodiment, the interface device may also be other interfaces. A specific representation of the other interfaces is not limited herein, as long as the interface unit can realize a switching function. In addition, a computation result of the chip is still sent back to the external device (such as a server) by the interface device.

The control device is electronically connected to the chip. The control device is configured to monitor a state of the chip. Specifically, the chip and the control device may be electrically connected through an SPI interface. The control device may include a micro controller unit (MCU). For example, the chip may include a plurality of processing chips, processing cores, or processing circuits, and may drive a plurality of loads. Therefore, the chip can be in different working states such as multi-load and light-load. The control device may realize regulation and control of working states of a plurality of processing chips, processing cores and/or processing circuits in the chip.

In some embodiments, the present disclosure provides an electronic device which includes the above board card.

The electronic device may include a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical equipment.

The vehicle may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

It should be understood that identical or similar parts in the above embodiments may be referred to each other, and for contents not described in detail in some embodiments, please refer to the identical or similar contents in other embodiments.

It should be noted that in the descriptions of the present disclosure, the terms "first", "second", etc., are only used for descriptive purposes, and should not be understood as indicating or implying relative importance. In addition, in the description of the present disclosure, unless otherwise specified, the word "plurality" means "at least two".

It should be understood that any process or method description in the flowchart or described in other ways herein represents one or more modules, segments, or parts of codes of executable instructions configured to implement specific logical functions or steps of the process. In addition, the scope of optional implementations of the present disclosure includes additional implementations, and the functions can be implemented in an order not shown or discussed in the present disclosure, or in a substantially simultaneous manner, or in a reverse order according to the functions involved, which should be understood by those skilled in the art to which the embodiments of this present disclosure belong.

It should be understood that each part of the present disclosure can be implemented by hardware, software, firmware, or a combination thereof. In the above implementations, a plurality of steps or methods can be implemented by using software or firmware stored in a memory and executed by a suitable instruction execution system. For example, if hardware is used for implementation, as in another implementation, the steps can be implemented by any one or more of the following technologies known in the art: a discrete logic circuit with a logic gate circuit configured to implement logic functions on data signals, an application-specific integrated circuit with a suitable combinational logic gate circuit, a programmable gate array (PGA), a field-programmable gate array (FPGA), and the like.

Those of ordinary skill in the art can understand that the entire or part of the flow in the methods as stated in the embodiments can be implemented by a program instructing related hardware, wherein the program may be stored in a computer readable storage medium and may include one or more of the methods as stated in the embodiments during execution.

In addition, the functional units in each example of the present application may be integrated into one processing module, or each of the units may exist separately and physically, or two or more units may be integrated into one module. The integrated module above may be implemented in the form of hardware or software function module. When the integrated module is implemented in the form of a software function module and sold or used as an independent product, the module may be stored in a computer-readable storage medium.

The storage medium may be a read-only memory, a disk, a compact disc, etc.

The term "an embodiment", "some embodiments", "example", "specific example", "some examples", or the like referred to herein means that particular features, structures, materials, or characteristics described in conjunction with the embodiment or the example may be contained in at least one embodiment or example of the present disclosure. In the specification, the schematic descriptions of the above terms do not necessarily refer to the same embodiment or example. In addition, the described specific features, structures, materials, or characteristics can be combined in any one or more embodiments or examples in a suitable manner.

Although embodiments of the present disclosure have been shown and described above, it should be understood that the above embodiments are only exemplary and not intended to limit the disclosure. Any changes, modifications, replacements, and variants of the embodiments can be made within the scope of the disclosure.

The invention claimed is:

1. A data processing device, comprising a machine learning device, a transmission circuit, and a shared memory, wherein the machine learning device is connected to the transmission circuit through a first transmission interface, and the transmission circuit is connected to the shared memory;

the transmission circuit is configured to obtain input data required by the machine learning device from the shared memory according to a data operation signal sent by the machine learning device, and return the input data to the machine learning device, where the data operation signal represents an operation mode for data in the shared memory;

wherein the transmission circuit includes: a second transmission interface, at least one read/write processing circuit connected to the second transmission interface, and an arbitration circuit connected to the read/write processing circuit the at least one machine learning unit is connected to the transmission circuit through a connection between the first transmission interface and the second transmission interface;

the read/write processing circuit is configured to receive the data operation signal sent by the at least one machine learning unit through the first transmission interface and the second transmission interface, transmit the data operation signal to the arbitration circuit, and transfer the data read from the shared memory to the at least one machine learning unit through the second transmission interface; and the arbitration circuit is configured to arbitrate the data operation signal received from the at least one read/write processing circuit according to a preset arbitration rule, and operate the data in the shared memory according to the data operation signal that has been successfully arbitrated.

2. The data processing device of claim 1, wherein the machine learning device is configured to perform a machine learning operation according to the input data to obtain output data.

3. The data processing device of claim 2, wherein the machine learning device is further configured to transfer the output data to the shared memory through the transmission circuit for data storage.

4. The data processing device of claim 3, wherein the machine learning device includes at least one machine learning unit, where the machine learning unit includes: at least one operation unit, and a controller unit connected to the operation unit;

the operation unit includes a primary processing circuit and a plurality of secondary processing circuits, where the operation unit is connected to the transmission circuit through the first transmission interface;

the controller unit is configured to send the data operation signal and the output data to the transmission circuit through a sending interface in the first transmission interface, receive the input data obtained by the transmission circuit from the shared memory through a receiving interface in the first transmission interface, and send the input data to the primary processing circuit and/or the secondary processing circuits;

the primary processing circuit is configured to distribute the input data to the plurality of secondary processing circuits; the plurality of secondary processing circuits are configured to perform intermediate operations in parallel according to data transferred by the primary processing circuit to obtain a plurality of intermediate results, and transfer the plurality of intermediate results to the primary processing circuit; and the primary processing circuit is further configured to perform subsequent processing on the plurality of intermediate results to obtain a computation result.

5. The data processing device of claim 4, wherein a structure of the primary processing circuit and the secondary processing circuits includes at least one of an H-type, a systolic array type, and a tree structure.

6. The data processing device of claim el, wherein the read/write processing circuit includes at least one of following processing circuits: a unicast read processing circuit, a unicast write processing circuit, and a broadcast processing circuit; the data operation signal includes at least one of a unicast read request, a unicast write request, a unicast read instruction, a unicast write instruction, a multicast instruction, and a broadcast instruction, where a unicast-type processing circuit is configured to process a unicast-type signal, and a broadcast-type processing circuit is configured to process a multicast-type or broadcast-type signal.

7. The data processing device of claim 6, wherein if the data operation signal is an instruction-type signal, the read/write processing circuit is specifically configured to parse the instruction-type signal, generate a request-type signal, and transmit the request-type signal to the arbitration circuit.

8. The data processing device of claim 6, wherein if the data operation signal is a multicast instruction, the multicast instruction carries identifiers of a plurality of target machine learning units that receive data; and the read/write processing circuit is specifically configured to send the data obtained by the arbitration circuit from the shared memory to the plurality of target machine learning units.

9. The data processing device of claim 6, wherein if the data operation signal is a broadcast instruction, the read/write processing circuit is specifically configured to transfer the data obtained by the arbitration circuit from the shared memory to all machine learning units.

10. The data processing device of claim 1, wherein the input data includes input neuron data or weight data, and the output data includes output neuron data.

11. The data processing device of claim 10, wherein the data processing device is divided into at least one cluster, where each cluster includes a plurality of machine learning units, a transmission circuit, and at least one shared memory;

the transmission circuit further includes: a first type of direct memory access controller (DMA) connected to an arbitration circuit in the cluster and the shared memory in the cluster, or, a second type of DMA connected to the arbitration circuit in the cluster and shared memories in other clusters, where the first type of DMA is configured to control data interaction between the arbitration circuit in the cluster and the shared memory in the cluster; and the second type of DMA is configured to control data interaction between the arbitration circuit in the cluster and shared memories in other clusters, and control data interaction between the arbitration circuit in the cluster and an off-chip memory.

12. The data processing device of claim 11, wherein the transmission circuit further includes: a first selection transmission circuit connected to the first type of DMA, and a second selection transmission circuit connected to the second type of DMA, where the first selection transmission circuit is configured to selectively connect the shared memory in the cluster where the first selection transmission circuit is located; and the second selection transmission circuit is configured to selectively connect shared memories in the cluster where the second selection transmission circuit is located and other clusters, and the off-chip memory.

13. The data processing device of claim 10, wherein the transmission circuit further includes: a caching circuit connected to the arbitration circuit and the shared memory, where the caching circuit is configured to temporarily store data obtained by the arbitration circuit from the shared memory, and temporarily store the data written by the arbitration circuit to the shared memory.

14. The data processing device of claim 10, wherein a transmission bandwidth between the transmission circuit and the shared memory is greater than a transmission bandwidth between the transmission circuit and the machine learning unit.

* * * * *